(12) United States Patent
Kanai et al.

(10) Patent No.: US 8,579,097 B2
(45) Date of Patent: Nov. 12, 2013

(54) CLUTCH RELEASE MECHANISM AND CLUTCH ASSEMBLY INCLUDING SAME

(75) Inventors: Yu Kanai, Saitama (JP); Kenji Matsuo, Saitama (JP); Hiromi Suzuki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 389 days.

(21) Appl. No.: 13/007,826

(22) Filed: Jan. 17, 2011

(65) Prior Publication Data
US 2011/0198183 A1 Aug. 18, 2011

(30) Foreign Application Priority Data

Feb. 12, 2010 (JP) ................................. 2010-028662

(51) Int. Cl.
*F16D 13/52* (2006.01)
*F16D 23/12* (2006.01)

(52) U.S. Cl.
USPC ..................................... 192/70.23; 192/89.21

(58) Field of Classification Search
USPC .................. 192/70.23, 89.21, 93 A
See application file for complete search history.

(56) References Cited

U.S. PATENT DOCUMENTS

| | | | | |
|---|---|---|---|---|
| 4,708,231 A | * | 11/1987 | Onda et al. | 192/103 F |
| 4,753,330 A | * | 6/1988 | Ohzono et al. | 192/48.4 |
| 4,787,493 A | * | 11/1988 | Ohsono et al. | 192/70.252 |
| 7,178,650 B2 | | 2/2007 | Tsukada | |
| 7,591,359 B2 | | 9/2009 | Koyama et al. | |
| 2009/0107797 A1 | * | 4/2009 | Oishi et al. | 192/93 A |

FOREIGN PATENT DOCUMENTS

| | | | |
|---|---|---|---|
| JP | 2000-220660 A | * | 8/2000 |
| JP | 2005-249083 A | | 9/2005 |
| JP | 2007-177873 A | | 7/2007 |

* cited by examiner

*Primary Examiner* — Richard M. Lorence
(74) *Attorney, Agent, or Firm* — Carrier Blackman & Associates, P.C.; William D. Blackman; Michael J. McCandlish (57) ABSTRACT

A clutch release mechanism includes a fixed cam plate having a cylindrical boss portion, and a movable cam plate supported on the cylindrical boss portion through a cylindrical projecting portion thereof. A ball unit is retained on the cylindrical boss portion by a retainer, and a release member disengages a clutch by transmitting a thrust force, generated by relative turning between the fixed and movable cam plates which hold the ball unit therebetween, to a pressure-applying plate. A pressing member is pressed by the movable cam plate to transmit the thrust force to the release member. The cylindrical projecting portion of the movable cam plate projects toward the pressing member, and is fitted a the hollow portion thereof with a gap therebetween. The movable cam plate presses the pressing member so as to be relatively shiftable on a flat surface perpendicular to a pressing direction.

20 Claims, 5 Drawing Sheets

CLUTCH RELEASE MECHANISM AND CLUTCH ASSEMBLY INCLUDING SAME

CROSS-REFERENCE TO RELATED APPLICATIONS

The present invention claims priority under 35 USC 119 based on Japanese patent application No. 2010-028662, filed on Feb. 12, 2010. The entire subject matter of this priority document, including specification claims and drawings thereof, is incorporated by reference herein.

BACKGROUND OF THE INVENTION

1. Technical Field

The present invention relates to a clutch release mechanism used to release the engagement of a multiple disk clutch device installed in a power unit, which may be freestanding, or alternatively, which may be incorporated into a vehicle such as a motorcycle, an all-terrain vehicle or the like.

2. Background Art

There is known a clutch release mechanism of a multiple disk clutch device configured as below, as disclosed in e.g. Patent Document 1 mentioned below. A plurality of balls are interposed between a fixed cam plate and a movable cam plate which are opposed to each other. A release member is pressed by use of a thrust force generated by the relative turning of both the cam plates to release the engagement of the clutch.

When the clutch release mechanism configured as disclosed in Patent Document 1 is assembled, the following is necessary. The movable cam plate is engaged with a pressure-applying plate and the balls are arranged on the movable cam plate. A fixed cam plate mounted to a case member covering a multiple disk clutch device is mounted along with the movable cam plate so as to hold the balls therebetween at accurate positions.

However, when the case member is assembled, it is necessary to perform the assembly while maintaining the state where the balls are received in the recessed portions of the movable cam plate. Therefore, there is a problem of poor workability.

In addition, to solve such a problem, for example, Patent Document 2 mentioned below discloses a clutch release mechanism as below. A retainer for balls is attached to a fixed cam plate. A plurality of balls are attached as a ball unit. The ball unit is prevented from coming off by a retaining member. A movable cam plate is fitted to a release member.

However, in the case of the clutch release mechanism configured as in Patent Document 2, a cylindrical boss portion of the fixed cam plate is inserted into the fixed cam plate. In addition, the relative positions of the respective axes of the movable cam plate and the release member are fixed. Therefore, to prevent the misalignment between the fixed cam plate and the movable cam plate, it is necessary to significantly reduce the cumulative tolerances from the clutch member to clutch inner member of a multiple disk clutch device.

Patent Document 1—Japanese Patent Laid-Open No. 2005-249083 (FIGS. 1 and 2)

Patent Document 2—Japanese Patent Laid-Open No. 2007-177873 (FIGS. 1 to 8)

SUMMARY OF THE INVENTION

The present invention aims to solve the problem associated with the conventional clutch release mechanism of a multiple disk clutch device as described above.

In addition, it is an object of the present invention to provide a clutch release mechanism that can avoid erroneous assembly due to misalignment of balls and facilitate assembly to improve workability during assembly of a case member of a multiple disk clutch device, that can increase a permissible range of misalignment between a fixed cam plate and a pressing member on a movable cam plate side and alleviate a requested tolerance for clutch constituent members, and that further restricts the axial length thereof to be configured compactly.

In order to achieve the above object, a first aspect of the invention is characterized in that in a clutch release mechanism includes a fixed cam plate held by a case member covering a multiple disk clutch device, and provided with a cylindrical boss portion projecting in a direction coaxial with, and away from a main shaft of a transmission, the cylindrical boss portion turnably supporting a movable cam plate so as to be turnable coaxially with the main shaft; the movable cam plate formed with a cylindrical projecting portion, supported turnably and axially slidably by the fixed cam plate by inserting the cylindrical boss portion through the cylindrical projecting portion, and turned through engagement with a clutch arm of the transmission; a ball unit housed between the fixed cam plate and the movable cam plate and held by the fixed cam plate by means of a retainer member provided on the fixed cam plate; a release member for releasing engagement of a clutch by transmitting, to a pressure-applying plate, a thrust force generated by relative turning of the fixed cam plate and the movable cam plate which hold the ball unit therebetween; and a pressing member fitted to the release member via a bearing, and pressed by the movable cam plate to receive the thrust force and transmit the thrust force to the release member via the bearing; the pressing member has a hollow portion passing therethrough in the main shaft direction, and the movable cam plate is formed to allow the cylindrical projecting portion to project toward the pressing member, and the cylindrical projecting portion is configured to be fitted into the hollow portion with a gap defined therebetween and to press the pressing member so as to be relatively shiftable on a flat surface perpendicular to a pressing direction.

A second aspect of the invention is characterized in that in the clutch release mechanism according to the first aspect, the hollow portion of the pressing member is formed with a step such that an inner diameter on a side adapted to receive the cylindrical projecting portion of the movable cam plate fitted therein is greater than an inner diameter on a side fitted to the bearing.

A third aspect of the invention is characterized in that in the clutch release mechanism according to the first aspect, the pressing member and the movable cam plate are pivotally supported to be turnable with each other with a positioning member holding a relative alignment position serving as a fulcrum and the hollow portion of the pressing member is formed to have an expanded hollow portion extending to a turning area of the cylindrical projecting portion of the movable cam plate with the positioning member serving as a fulcrum.

A fourth aspect of the invention is characterized in that in the clutch release mechanism according to the first aspect, the positioning member holding a relative alignment position between the pressing member and the movable cam plate is not provided.

According to the clutch release mechanism of the first aspect hereof, the pressing member is formed to have the hollow portion, and the cylindrical projecting portion of the movable cam plate is formed to project toward the pressing member and is fitted into the hollow portion with the gap defined therebetween. Therefore, the hollow portion and the cylindrical projecting portion of the movable cam plate overlap each other and extend in the main shaft direction. Thus, even in the configuration where the ball unit is held by the fixed cam plate side and the pressure-applying plate is pressed via the pressing member, the clutch release mechanism is restricted in axial length so that it can be configured compactly.

The movable cam plate is positioned by the engaging portion with the clutch arm turned along with the change spindle of the transmission and the fitting of the pressing member fitted to the release member into the hollow portion. Therefore, the position of the movable cam plate attached to the transmission side can be set easily and accurately. The ball unit is held at the predetermined position on the fixed cam plate side. Therefore, during the assembly of the clutch release mechanism, the position of the movable cam plate can easily be aligned with the position of the fixed cam plate including the ball unit attached to the case member side. Thus, the possibility of the erroneous assembly due to the misalignment of the ball position can be eliminated, which enhances assembly workability.

The cylindrical boss portion of the fixed cam plate is inserted through the cylindrical projecting portion of the movable cam plate. The pressing position of the movable cam plate is restricted by the cylindrical boss portion on the case member side. On the other side, the pressing member is fitted to the release member via the bearing. Therefore, the pressed position is restricted by the release member on the transmission side.

However, the movable cam plate of the present invention is configured such that the cylindrical projecting portion is fitted into the hollow portion of the pressing member with the gap defined therebetween and presses the pressing member so as to be relatively shiftable on the flat surface perpendicular to the pressing direction.

Misalignment may be present between the case member side and the transmission side. Specifically, there may be misalignment between the movable cam plate defined in position by the cylindrical boss portion of the fixed cam plate and the pressing member defined in position by the release member. Even in such a case, with the configuration as above, since the movable cam plate presses the pressing member so as to be relatively shiftable on the flat surface perpendicular to the pressing direction, the pressing direction is not deflected.

Thus, clutch release can be done without trouble and with comfort, which improves a shift feeling. In addition, since the permissible range of misalignment is large, the requested tolerance for the clutch constituent members can be alleviated, which contributes to a cost reduction.

According to the clutch release mechanism of the invention of the second aspect hereof, in addition to the effects of the invention of the first aspect, the cylindrical projecting portion of the movable cam plate can be fitted into the hollow portion of the pressing member with the gap defined therebetween without increasing the diameter of the bearing. Therefore, the space for the clutch release mechanism can be restricted.

According to the clutch release mechanism of the third aspect hereof, in addition to the effects of the invention of the first aspect, the hollow portion of the pressing member pivotally supported by the movable cam plate and the positioning member has the extended hollow portion. The extended hollow portion extends to the turning area of the cylinder projecting portion along the turning direction of the movable cam plate with the positioning member serving as a fulcrum. Therefore, a range can be enlarged where the deflection of the pressing due to the misalignment between the pressing member and the movable cam plate defined in position by the cylindrical boss portion of the fixed cam plate can be prevented substantially. Thus, the shift feeling can be more stabilized. In addition, the permissible range of the misalignment between the fixed cam plate and the pressing member on the movable cam plate side can be more enlarged.

According to the clutch release mechanism of the fourth aspect, in addition to the effects of the first aspect, the cylindrical projecting portion of the movable cam plate is fitted into the hollow portion of the pressing member fitted to the release member via the bearing. Therefore, during the assembly of the clutch release mechanism, the movable cam plate can be positioned by the engaging portion with the crank arm and the cylindrical projecting portion. Thus, it is possible to omit the positioning member holding the relative alignment position between the pressing member and the movable cam plate, whereby the number of component parts can be reduced.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF ILLUSTRATIVE EMBODIMENTS

It should be understood that only structures considered necessary for clarifying the present invention are described herein. Other conventional structures, and those of ancillary and auxiliary components of the system, will be known and understood by those skilled in the art.

A clutch release mechanism according to a number of selected illustrative embodiments of the present invention, and a modification resulting from modifying part of the clutch release mechanism, will now be described with reference to FIGS. 1 through 5.

A clutch release mechanism 20, according to a first illustrative embodiment of the present invention described herein, is used to release the engagement of a multiple disk clutch device installed in a power unit of a motorcycle, an all-terrain vehicle or the like. However, the present invention shall not be limited to the use of a power unit in a vehicle. A clutch mechanism according to an embodiment of the present invention may also be applied to a stationary power unit. In addition, the engine type, the number of cylinders and the like of an internal combustion engine constituting part of the power unit are not restricted.

Figure 1:
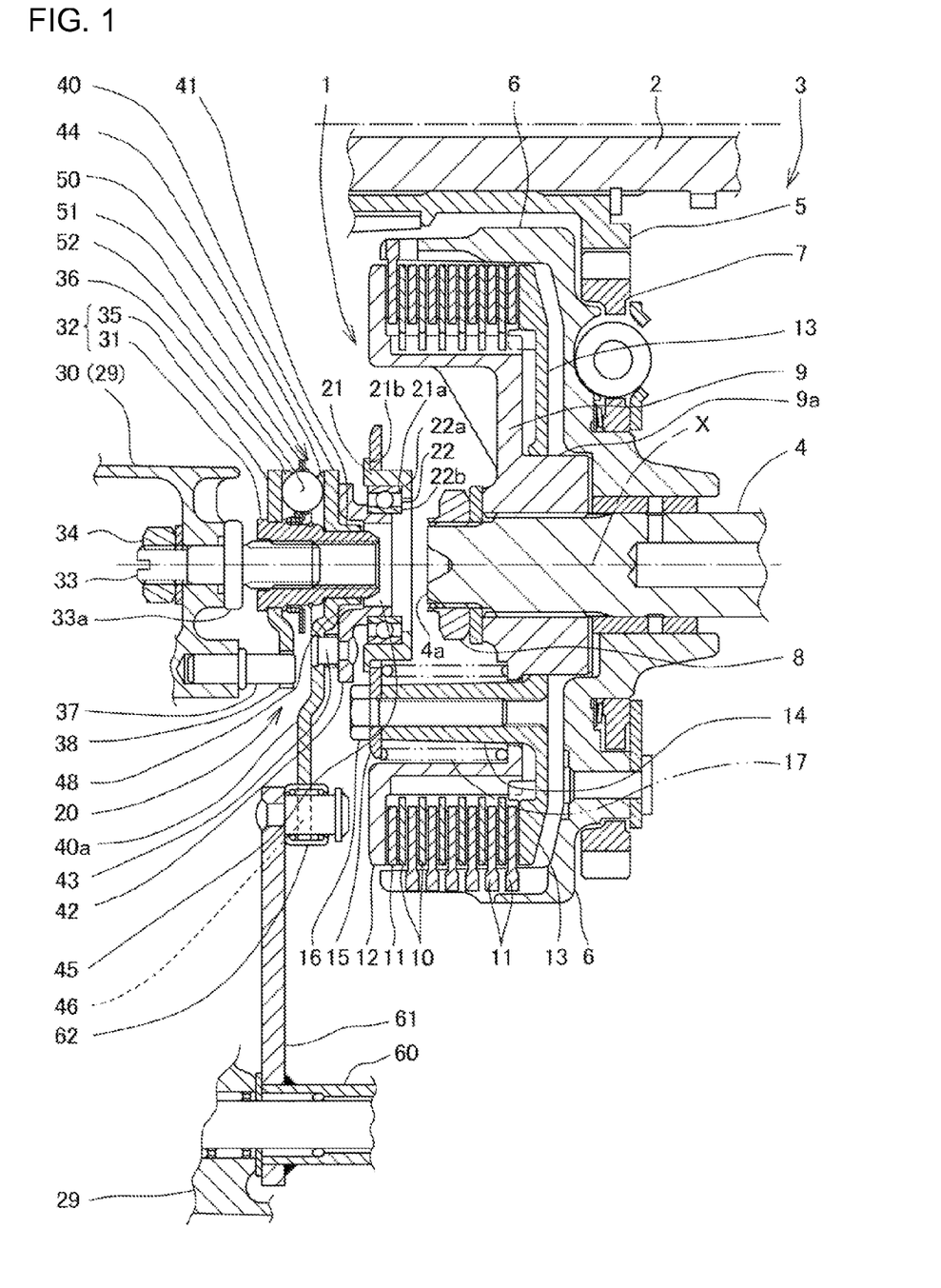
FIG. 1 is a cross-sectional view of a multiple disk clutch device provided with a clutch release mechanism according to an embodiment of the present invention, additionally illustrating a portion of a transmission and the like adjacent to the multiple disk clutch device.

In the embodiment illustrated in FIG. 1, a multiple disk clutch device 1 is disposed on a rotary power transmission path extending from a crankshaft 2 of a power unit whose whole picture is not illustrated, to a main shaft 4 of a transmission 3. During operation, the clutch device does not transmit the rotary power of the crankshaft 2 to the main shaft 4 of the transmission 3 during the gear shifting of the transmission 3, but instead, transmits the rotary power to the main shaft 4 of the transmission 3 upon completion of the gear shifting.

FIG. 1 is a cross-sectional view of the multiple disk clutch device 1 of the power unit where the crankshaft 2 and the main shaft 4 are arranged generally horizontally when mounted on the vehicle, additionally illustrating a portion of the transmission 3 and the like adjacent to the multiple disk clutch device. However, the on-board arrangement direction of the main shaft 4 is not restrictive. The main shaft 4 arranged in the normal vehicle-traveling direction or in the vehicle-widthwise direction as well as in various directions is applicable.

Referring to FIG. 1, the main shaft 4 of the transmission 3 is configured to receive the rotary power of the crankshaft 2, transmitted either directly or via a centrifugal start clutch (not illustrated) from a primary drive gear 5 carried on the crankshaft 2 via the multiple disk clutch device 1.

The multiple disk clutch device 1 is provided with a bottomed cylindrical clutch outer cover 6 rotatably supported by the main shaft 4 of the transmission 3. A primary driven gear 7 meshing with the primary drive gear 5 is mounted to the bottom outer side of the clutch outer cover 6. The primary drive gear 5, having a relatively small diameter, and the primary driven gear 7 having a larger diameter than that of the primary drive gear 5 cooperate to form a primary reduction gear.

A bottomed cylindrical clutch inner member 9 is disposed inside the clutch outer cover 6 so as to be spline-fitted and secured to the main shaft 4 by means of a nut 8. A plurality of driven friction plates 10 slidably spline-engaged with a circumferential wall portion of the clutch inner member 9 alternately overlap a plurality of drive friction plates 11 slidably spline-engaged with a circumferential wall portion of the clutch outer cover 6.

A pressure-receiving plate 12 formed integrally with the clutch inner member 9 is located opposite a frictional drive plate 11 located on the outermost side. A pressure-applying plate 13, slidably supported by the outer circumferential surface of a boss 9a of the clutch inner member 9, is located opposite a frictional drive plate 11 located on the innermost side.

A plurality of support bosses 14 (only one is shown in FIG. 1) passing through the bottom of the clutch inner member 9 are integrally provided on the pressure-applying plate 13 so as to project therefrom. A connection plate 15 is secured by use of bolts 16 so as to connect the leading ends of the support bosses 14 together. A clutch spring 17 is compressively provided between the connection plate 15 and the bottom of the clutch inner member 9.

In this way, in the multiple disk clutch device 1, the clutch spring 17 normally biases the connection plate 15 and the bottom of the clutch inner member 9 to widen the interval therebetween. The pressure-applying plate 13 is biased to come close to the pressure-receiving plate 12 of the clutch inner member 9, so that the drive friction plates 11 and the driven friction plates 10 are brought into press-contact with each other. Thus, the multiple disk clutch device 1 is engaged (brought into a connection state).

That is to say, the rotary power is transmitted from the clutch outer cover 6 to the clutch inner member 9; therefore, the rotary power of the crankshaft 2 is transmitted from the crankshaft 2 side to the main shaft 4 side.

The clutch release mechanism 20 for releasing the engagement of the multiple disk clutch device 1 includes, primarily, a collar member 21 ("the release member" of the present invention), a release bearing 22 ("the bearing" of the present invention), a fixed cam plate 32, a movable cam plate 40, a pressing member 42, and a ball unit 50.

The collar member 21 is capable of pressing the pressure-applying plate 13 via the connection plate 15 and the support bosses 14. The release bearing 22 is installed inside the collar member 21. The fixed cam plate 32 is held by a case member 30, and includes a cylindrical boss portion 31 projecting in a direction away from the main shaft 4 of the transmission 3. The boss portion 31 of the fixed cam plate 32 is disposed coaxial with a central axis X of the main shaft 4. The case member 30 constitutes part of the power unit case 29 and covers the multiple disk clutch device 1. The movable cam plate 40 is rotatably supported by the cylindrical boss portion 31, and is slidably movable along an axis coaxial with the central axis X of the main shaft 4. The pressing member 42 is pivotally supported by the movable cam plate 40 by means of a rivet 43 ("the positioning member" of the present invention) and is fitted to the collar member 21 via the release bearing 22. The ball unit 50 is disposed between the fixed cam plate 32 and the movable cam plate 40.

The collar member 21 is cylindrically formed to internally house the release bearing 22 by use of a bearing abutment portion 21a formed to bend inwardly at one end, and is retained in a central opening portion of the connection plate 15 by use of a connection plate abutment portion 21b formed to bend outwardly at the other end.

If the release bearing 22 is attached to the inside of the collar member 21, the bearing abutment portion 21a comes into abutment against a lateral surface, of an outer race 22a of the release bearing 22, opposed to the multiple disk clutch device 1. In addition, the inner lateral surface of the collar member 21 comes into abutment against the outer circumferential surface of the outer race 22a.

In addition, an adjustment bolt 33 is provided on the case member 30, arranged to be coaxial with the main shaft 4 in the assembled state. The adjustment bolt 33 extends through a hollow bore formed in the case member, and is secured to the case member 30 by a medial flange 33a formed integrally thereon, and by a nut 34 threadably engaged therewith.

The cylindrical boss portion 31 of the fixed cam plate is formed with an internal female thread along its axis. In addition, the cylindrical boss portion 31 is threadably engaged with the leading end of the adjustment bolt 33, and extends from the adjustment bolt 33 to the inside of the pressing member 42 which, in turn, is disposed in the inner race 22b of the release bearing 22.

Figure 2:
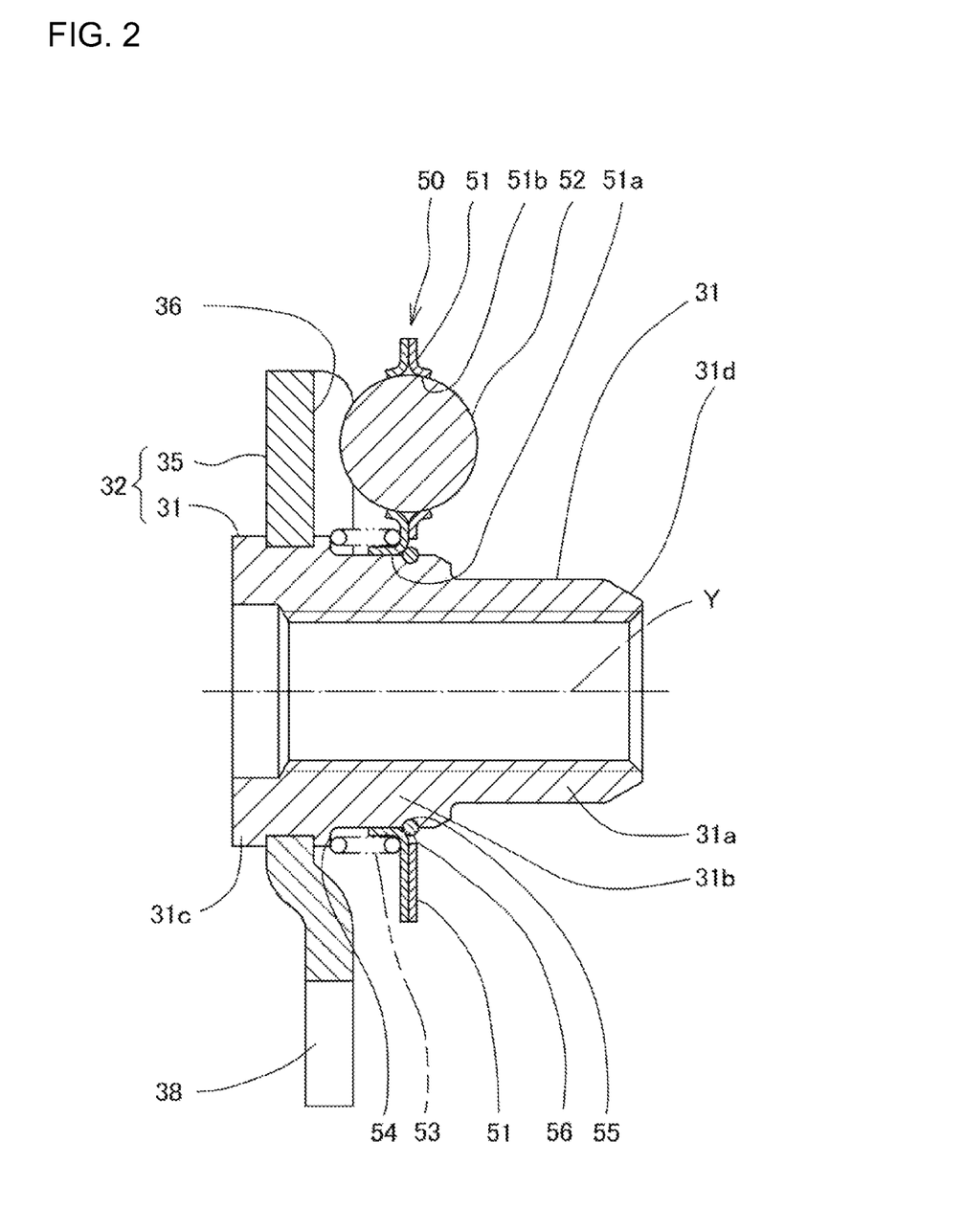
FIG. 2 is an enlarged cross-sectional view for assistance in explaining a fixed cam plate and a ball unit in the present embodiment.

A structure of the fixed cam plate 32 and of the ball unit 50 is described below, with reference also to FIG. 2.

The cylindrical boss portion 31 is formed at a leading end portion with a movable cam support portion 31a, which rotatably and axially slidably supports a cylindrical projecting portion 41 of the movable cam plate 40 thereon, coaxially with the main shaft 4. The movable cam support portion 31a is formed on a leading end side with a tapered outer tip portion 31d to make it easy to receive the movable cam plate 40 attached thereto.

The cylindrical boss portion 31 is formed at an intermediate portion with a retainer fitting portion 31b having a diameter slightly greater than that of the cam support portion 31a.

The retainer fitting portion 31b is configured such that the retainer 51 of the ball unit 50 is fitted thereto.

The cylindrical boss portion 31 is formed at a proximal end with a fixed cam joint portion 31c having a diameter slightly greater than that of the retainer fitting portion 31b. A plate portion 35 of the fixed cam plate 32 is joined to the outer circumferential portion of the fixed joint portion 31c so as to be substantially parallel to the movable cam plate 40. The cylindrical boss portion 31 and the plate portion 35 form the integral fixed cam plate 32.

The plate portion 35 of the fixed cam plate 32 is formed with cam-like recessed portions 36 respectively engaged with balls 52 of the ball unit 50 at three positions at circumferentially regular intervals.

The plate portion 35 has a pin-engaging portion 38 formed in a circumferential edge portion thereof, which receives a rotation-prevention pin 37 therein. The rotation-prevention pin 37 is fixedly provided in the case member 30, and prevents the turning of the fixed cam plate 32 by its engagement with the pin-engaging portion 38.

The ball unit 50 is positioned between the fixed cam plate 32 and the movable cam plate 40. The ball unit 50 includes a retainer 51, fitted to the cylindrical boss portion 31 of the fixed cam plate 32, and three steel balls 52 held by the retainer 51.

The retainer 51 is formed at a central portion with a fitting hole 51a capable of being fitted to the retainer fitting portion 31b of the cylindrical boss portion 31. The retainer 51 is formed with three ball-holding holes 51b at regular intervals in a rotary, i.e., circumferential direction of the movable cam plate 40. The balls 52 are rotatably held by the respective ball-holding holes 51b.

A biasing spring (a compressive coil spring) 53 is attached to the outer circumferential portion of the retainer fitting portion 31b so as to bias the ball unit 50 in a direction of slidably shifting it toward the movable cam plate 40. The biasing spring 53 is designed to have one end coming into contact with the retainer 51 and the other end coming into contact with a stepped portion 54 of the cylindrical boss portion 31, between the retainer fitting portion 31b and the fixed cam joint portion 31c. The biasing force of the biasing spring 53 is set at a level sufficiently smaller than that of the clutch spring 17. A C-clip 56 (the locking member of the present invention) is attached to a ring groove 55 formed on the outer circumferential portion of the retainer fitting portion 31b. This prevents the ball unit 51 from coming off from the cylindrical boss portion 31.

Figure 4:
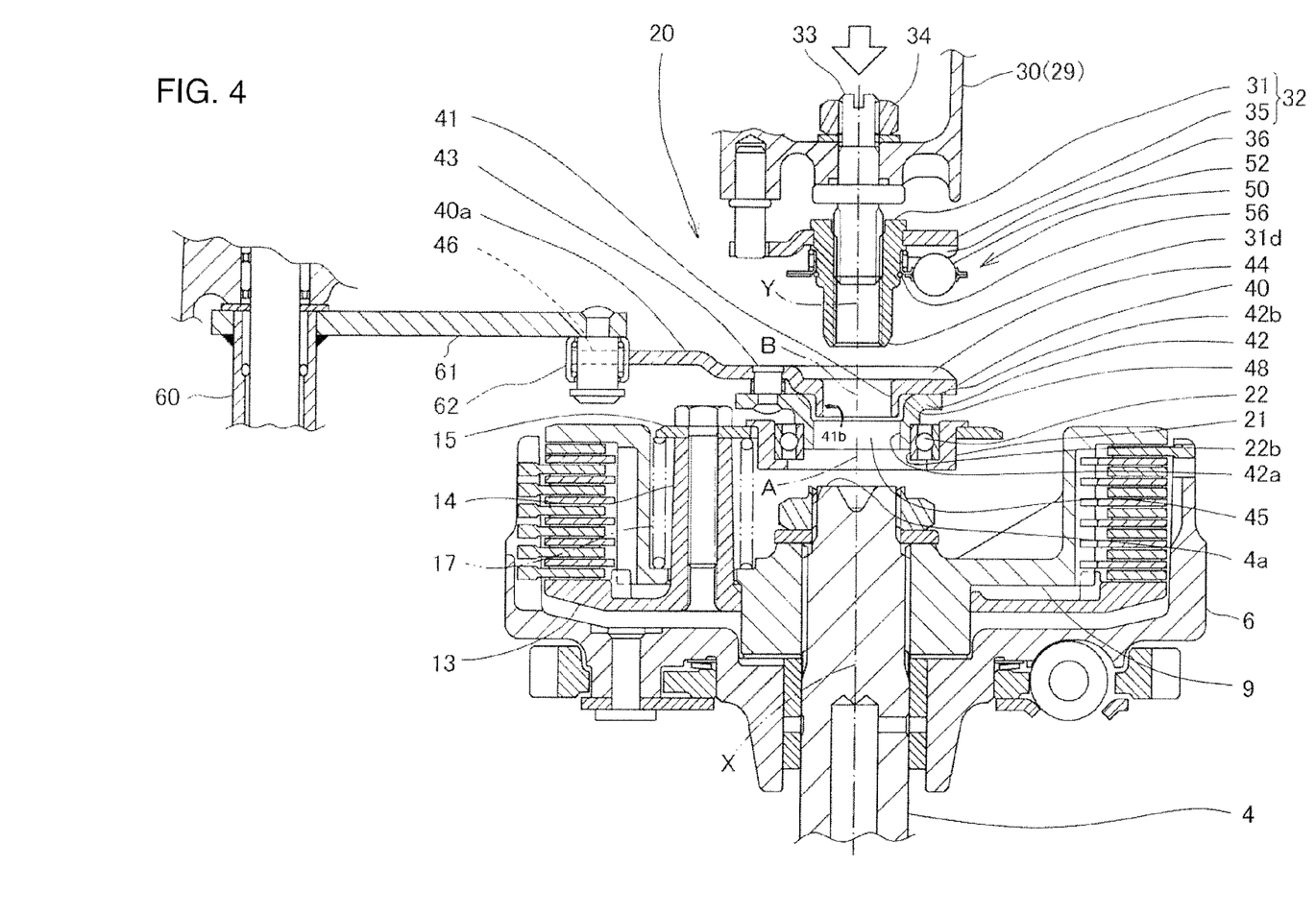
FIG. 4 is a cross-sectional view for assistance in explaining an assembling state of the clutch release mechanism of the present embodiment.

In addition, the movable cam plate 40 is formed with a cylindrical projecting portion 41 thereon, which extends coaxially with the main shaft 4 toward a main shaft end 4a. The cylindrical projecting portion 41 of the movable cam plate 40 has a hollow central bore 41b formed therethrough, as shown in FIG. 4. In addition, the cylindrical projecting portion 41 is rotatably and axially slidably supported on the outer circumference of the movable cam support portion 31b of the cylinder boss portion 31 coaxially with the main shaft 4.

The movable cam plate 40 is formed with cam-like recessed portions 44 at three positions at circumferentially regular intervals at respective portions opposed to and fitted to the corresponding balls 52 of the ball unit 50 held by the fixed cam plate 32 side.

In this way, each of the balls 52 held at both ends by the corresponding ball holding hole 51b of the retainer 51 is put between the respective cam-like recessed portions 36, 44 of the fixed cam plate 32 and the movable cam plate. Thus, the rotation of the ball unit 50 is restricted.

The outer circumferential portion of the movable cam plate 40 partially extends outwardly to form a control lever 40a. The control lever 40a is formed at a leading end with an engaging groove 46 with which a leading end of a clutch arm 61 is engaged. The clutch arm 61 is secured to one end of a change spindle 60 of the transmission 3.

A roller 62 is pivotally connected to the leading end of the clutch arm 61 and is engaged with the engaging groove 46. Thus, the clutch arm 61 is turned to make the control lever 40a smoothly turn. The change spindle 60 is supported by the power unit case 29 in an orientation substantially parallel to the main shaft 4, and is operatively turned by a change pedal, a motor or the like (not illustrated).

The pressing member 42 is pivotally supported on the movable cam plate 40 by means of a rivet 43 extending therebetween and arranged so as to be in contact with a main shaft-side surface of the movable cam plate 40.

Figure 3:
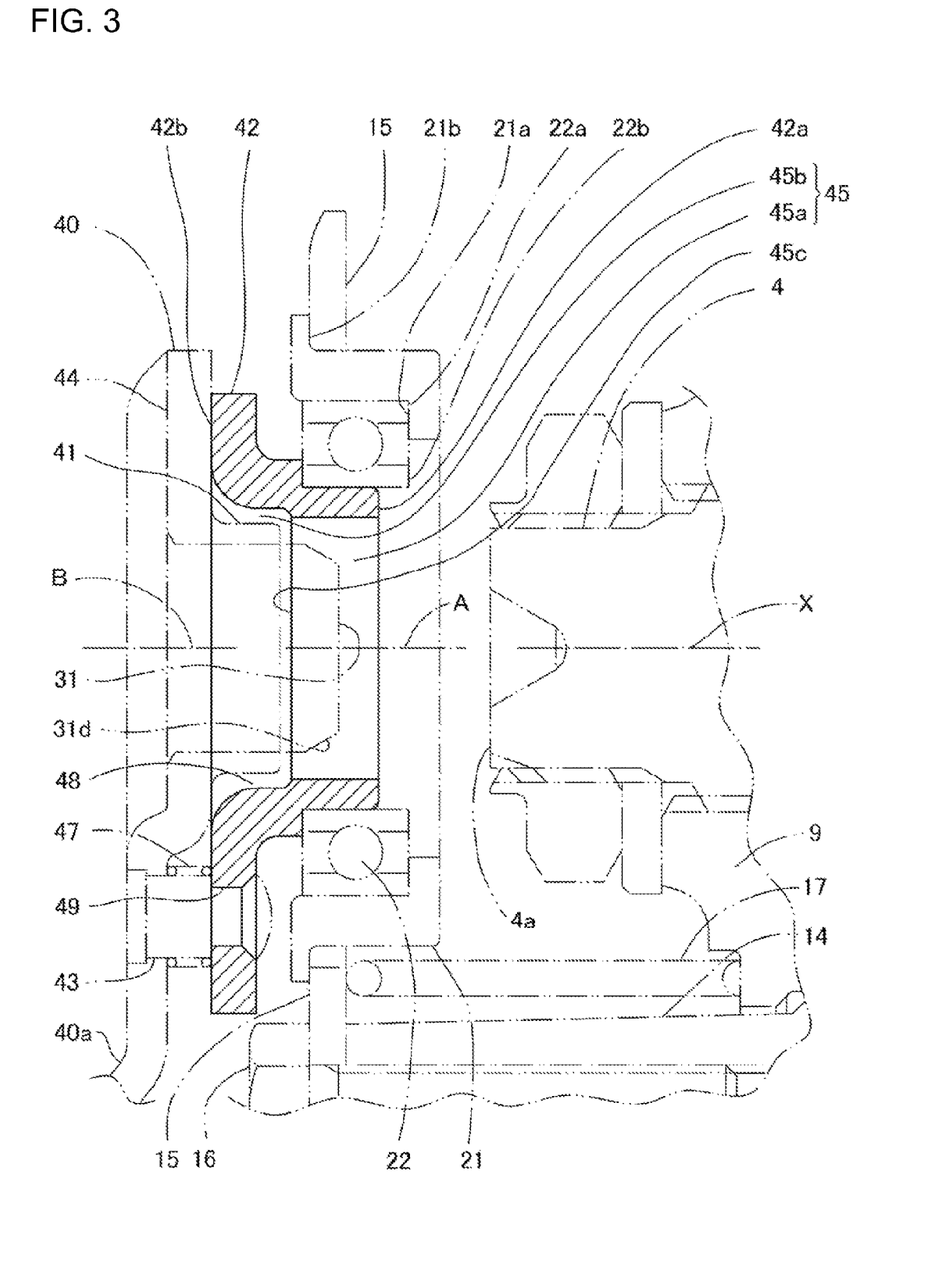
FIG. 3 is an enlarged cross-sectional view for assistance in explaining the relationship between a pressing member and, a movable cam plate, a release bearing, a collar member and the like in the present embodiment.

The relationship between the pressing member 42 and associated components including the movable cam plate 40, the release bearing 22, the collar member 21 and the like is hereinafter described, with reference also to FIG. 3.

The rivet 43 is a positioning member adapted to hold a relative alignment position between the movable cam plate 40 and the pressing member 42. The movable cam plate 40 and the pressing member 42 are pivotally supported so as to be relatively turnable with the rivet 43 serving as a fulcrum. For convenience of assembly, the movable cam plate 40 and the pressing member 42 do not come into close contact with each other in the axial direction of the rivet 43 in the vicinity of the rivet 43. A coil spring 47 is interposed between the movable cam plate 40 and the pressing member 42, so that the movable cam plate 40 and the pressing member 42 are swingable with respect to each other, in a limited range, in the axial direction of the rivet 43. In FIG. 3, reference numeral 49 denotes a rivet hole formed through the pressing member 42 for receiving a shaft portion of the rivet 43.

The pressing member 42 has a hollow portion 45 passing therethrough in a main shaft direction, and this hollow portion 45 includes a cylindrical portion 42a extending toward the main shaft end 4a, and a flange portion 42b having a flat surface vertical to the main shaft direction and in contact with the movable cam plate 40. The pressing member 42 is pivotally supported on the movable cam plate 40 by the rivet 43, with the spring 47 interposed therebetween as described above. In addition, the cylindrical portion 42a of the pressing member 42 is fitted into the inner race 22b of the release bearing 22, as shown.

In this way, the pressing member 42 is turnably connected to the collar member 21 via the release bearing 22, and is disposed coaxially with the main shaft 4.

The cylindrical projecting portion 41 of the movable cam plate 40, formed to protrude toward the pressing member 42, is fitted into the hollow portion 45 of the pressing member 42 with a gap 48 defined therebetween along with the end (indicated with a two-dot chain line in FIG. 3), of the cylindrical boss portion 31, extending through the cylindrical projecting portion 41.

Because of this, in the present embodiment, the hollow portion 45 is formed with a bearing-side hollow portion 45a adapted to receive at least the cylindrical boss portion 31 therein with a gap therebetween, and also with a movable cam-side hollow portion 45b adapted to receive the cylindrical projecting portion 41 therein with another gap 48 defined therebetween. A stepped portion 45c ("the step" of the present invention) is formed between the bearing-side hollow portion 45a and the movable cam-side hollow portion 45b.

In other words, the hollow portion 45 of the pressing portion 42 is formed to have the stepped portion 45c in such a manner that the inner diameter of the movable cam-side hollow portion 45b into which the cylindrical projecting portion 41 of the movable cam plate 40 is fitted is greater than that of the bearing-side hollow portion 45a fitted to the release bearing 22.

Thus, the cylindrical projecting portion 41 of the movable cam plate 40 can be fitted into the hollow portion 45 of the pressing member 42 with the gap 48 defined therebetween without increasing the diameter of the release bearing 22.

The flange portion 42b is formed to contact the movable cam plate 40 at a flat surface perpendicular to a direction where the movable cam plate 40 presses the pressing member 42. Thus, the movable cam plate 40 is formed to press the pressing member 42 so as to be relatively shiftable on the flat surface of the flange portion 42b.

In the clutch release mechanism 20 described above, if the control lever 40a is pressed, the movable cam plate 40 and the pressing member 42 connected to the movable cam plate 40 with the rivet 43 is turned around the cylindrical boss portion 31 of the fixed cam plate 32. Then, while rolling, the ball 52 of the ball unit 50 smoothly mounts the slope of the cam-like recessed portion 44 of the movable cam plate 40. In this way, the movable cam plate 40 and the pressing member 42 are pressed and shifted rightward (the main shaft 4 side) in FIG. 1 by a reaction force (a thrust force) received via the ball 52 from the plate portion 35 of the fixed cam plate 32 secured.

The pressing member 42 transmits the thrust force to the collar member 21 via the release bearing 22 and the collar member 21 transmits it to the connection plate 15. The connection plate 15 compresses the compressive spring 17 against its biasing force and transmits the thrust force to the pressure-applying plate 13 via the support bosses 14 to shift the pressure-applying plate 13 rightward in the figure. In this way, the frictional engagement between the drive friction plate 11 and the driven friction plate 10 is released, which releases the engagement state of the multiple disk clutch device 1.

A description is given of the characteristics and the like of the clutch release mechanism 20 in the present embodiment encountered during assembly.

During assembly of the clutch release mechanism 20 in the present embodiment, as illustrated in FIG. 4, while the main shaft end 4a on the transmission 3 side is made to face the substantial upside, the collar member 21 is attached to the connection plate 15 and the release bearing 22 is fitted to the collar member 21.

To attach the movable cam plate 40 there, the engaging groove 46 of the control lever 40a is engaged with the roller 62 of the clutch arm 61. In addition, the cylindrical portion 42a of the pressing member 42 pivotally supported by the movable cam plate 40 with the rivet 43 is fitted into the inner race 22b of the release bearing 22, the cylindrical portion 42a extending toward the main shaft 4.

The cylindrical projecting portion 41 of the movable cam plate 40 is fitted into the movable cam-side hollow portion 45b of the hollow portion 45 of the pressing member 42 with the gap 48 defined therebetween.

With this, during the assembly, the movable cam plate 40 is permitted to swing in a given range with respect to the pressing member 42 with the rivet 43 severing as a fulcrum as well as to be turned according to the gap 48. However, the movable cam plate 40 is positionally determined in a given range by the roller 62 of the clutch arm 61 and the pressing member 42.

In addition, the fixed cam plate 32 and the like are additionally mounted to the case member 30 side. With its inner surface side faced generally downward, the members are assembled to cover the transmission 3 side already assembled as indicated with a blank arrow in FIG. 4.

With the assembly, the cylindrical boss portion 31 of the fixed cam plate 32 turnably and axially slidably supporting the movable cam plate 40 goes into the hollow bore 41b in the cylindrical projecting portion 41 of the movable cam plate 40, while being guided by the tapered outer tip portion 31d at the leading end thereof.

The axis Y of the cylindrical boss portion 31 is positionally determined by the cylindrical boss portion 31 being attached to the case member 30 side. However, the axis Y of the cylindrical boss portion 31 may probably misalign with the axis X of the main shaft 4 because of the cumulated tolerances resulting from the assembly of the members on the case member 30 side and on the transmission 3 side (the main shaft 4 side).

In addition, since the pressing member 42 is fitted to the release bearing 22, the axis A of the pressing member 42 is generally aligned with the central axis X of the main shaft 4. Therefore, there is a possibility that the axis A of the pressing member 42 is misaligned with the axis Y of the cylindrical boss portion 31.

However, the pressing member 42 attached to the transmission 3 side and the movable cam plate 40 are permitted to swing in a given range with the rivet 43 serving as a fulcrum as well as to be turned according to the gap 48. Therefore, the axis B of the cylindrical projecting portion 41 of the movable cam plate 40 has room for swing and turning in a given range during assembly, and does not always follow the axis A.

Therefore, when the cylindrical boss portion 31 is placed into the cylindrical projecting portion 41, the axis B follows and aligns with the axis Y, thereby avoiding the difficulty of the assembly due to the misalignment. The leading end of the cylindrical boss portion 31 passing through the cylindrical concave portion 41 is fitted into the bearing-side hollow portion 45a inside the cylindrical portion 42a of the pressing member 42 with the gap defined therebetween (see FIGS. 1 and 3). Thus, the assembly can be done successfully.

In this case, the ball unit 50 is supported on the fixed cam plate 32 on the case member 30 side. Therefore, if the position of the ball unit 50 is accurately set, the balls 52 of the ball unit 50 are accurately positioned and held between the cam-like recessed portions 36 and 44 as the plate portion 35 of the fixed cam plate 32 are allowed to come close to the movable cam plate 40.

Thus, the present embodiment eliminates an excessive request of accuracy for the members and the assembly to reduce the cumulated tolerances as in the conventional example. This reduces the manufacturing costs and the assembly workability is more enhanced.

A further detailed description is given of the characteristics of the clutch release mechanism of the present embodiment. In the characteristic structure, the pressing member 42 is formed to have the hollow portion 45. In addition, the cylindrical projecting portion 41 of the movable cam plate 40 is formed to project toward the pressing member 42 and is fitted to the hollow portion 45 with the gap 48 defined therebetween.

In this way, the hollow portion 45 and the cylindrical projecting portion 41 of the movable cam plate 40 overlap each other and extend in the direction of the main shaft 4. Therefore, even in the configuration in which the ball unit 50 is held by the fixed cam plate 32 side and the release bearing 22, the collar member 21 and the connection plate 15 are sequentially pressed via the pressing member 42 to press the pressure-applying plate 13, the clutch release mechanism 20 is restricted in axial length and formed compactly.

The movable cam plate 40 is positioned by the engaging portion with the clutch arm 61 turned along with the change spindle 60 of the transmission 3 and the fitting of the pressing member 42 fitted to the collar member 21 (the release member) via the release bearing 22 into the hollow portion 45 of the pressing member 42. Therefore, the position of the movable cam plate 40 attached to the transmission 3 side can be set easily and accurately.

The ball unit 50 is held at a predetermined position on the fixed cam plate 32 side. Therefore, during the assembly of the clutch release mechanism 20, the position of the movable cam plate 40 can easily be aligned with that of the fixed cam plate 32, including the ball unit 50, attached to the case member side. Therefore, the possibility of erroneous assembly due to the positional misalignment of the balls 52 is eliminated to enhance assembly workability.

The cylindrical boss portion 31 of the fixed cam plate 32 is inserted through the cylindrical projecting portion 41 of the movable cam plate 40. In addition, the pressing position of the movable cam plate 40 is defined by the cylindrical boss portion 31 on the case member 30 side. In addition, the pressing member 42 is fitted to the collar member 21 via the release bearing 22; therefore, the pressed position is defined by the collar member 21 on the transmission 3 side.

However, the movable cam plate 40 of the present embodiment is configured such that the cylindrical projecting portion 41 is fitted to the hollow portion 45 of the pressing member 42 with the gap 48 defined therebetween. In addition, the movable cam plate 40 presses the pressing member 42 so as to be relatively shiftable on the flat surface perpendicular to the pressing direction.

The case member 30 side may be misaligned with the transmission 3 side. Specifically, the movable cam plate 40 defined in position by the cylindrical boss portion 31 of the fixed cam plate 32 may be misaligned with the pressing member 42 defined in position by the collar member 21. With the configuration as above, even if there is such misalignment, the movable cam plate 40 presses the pressing member 42 so as to be relatively shiftable on the flat surface perpendicular to the pressing direction. Therefore, the pressing direction will not be deflected.

Accordingly, the clutch release can be done without any problem and with comfort, so that a shift feeling during shifting is improved. In addition, since the permissible range of misalignment is large because of the gap 48, a requested tolerance for the clutch constituent member can be alleviated, which can contribute to a cost reduction.

The hollow portion 45 of the pressing member 42 is formed with the stepped portion 45c such that the inner diameter of the movable cam-side hollow portion 45b to which the cylindrical projecting portion 41 of the movable cam plate 40 is fitted is greater than that of the bearing-side hollow portion 45a to which the release bearing 22 is fitted. Therefore, the cylindrical projecting portion 41 of the movable cam plate 40 can be fitted to the hollow portion 45 of the pressing member 42 with the gap 48 defined therebetween without increasing the diameter of the release bearing 22. Thus, the space for the clutch release mechanism 20 can be restricted.

A modification of the present embodiment is next described with reference to FIG. 5.

The present modification is the same as the embodiment except the shape of a pressing member 142 in the modified embodiment is partially different from the pressing member 42 of the first embodiment. The same portions as in the present embodiment are described with only the terms and reference numerals in the explanation with their illustrations omitted.

Figure 5:
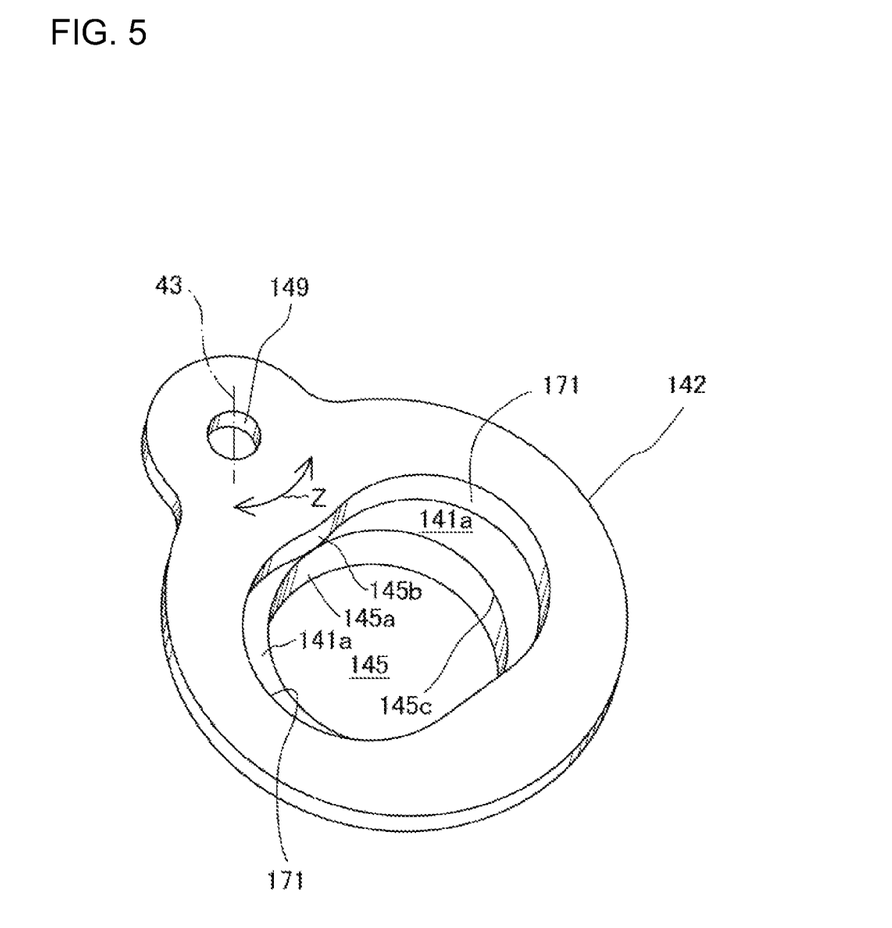
FIG. 5 is a perspective view of a pressing member as a modification of the clutch release mechanism in the present embodiment.

There is shown a pressing member of the modified embodiment in FIG. 5, in which portions are denoted with reference numerals in the 100 s whose last two digits are the same as the reference numerals of the corresponding portions of the present embodiment and new portions are denoted with additional reference numerals in the 100 s.

A pressing member 142 of the present modification is formed with a bearing-side hollow portion 145a and a movable cam-side hollow portion 145b in a hollow portion 145. The bearing-side hollow portion 145a is adapted to receive the leading end of the cylindrical boss portion 31 fitted thereinto with a gap defined therebetween, the cylindrical boss portion 31 going into the cylindrical projecting portion 41 of the movable cam plate 40. The movable cam-side hollow portion 145b is adapted to receive the cylindrical projecting portion 41 fitted thereinto with a gap 48 defined therebetween, similar to the gap 48 shown in FIG. 4. A stepped portion 145c is formed between the bearing-side hollow portion 145a and the movable cam-side hollow portion 145b.

The pressing member 142 and the movable cam plate 40 are pivotally supported so as to be turnable with each other with the rivet 43 serving as a fulcrum. The rivet 43 acts as a positioning member which holds the relative alignment position between the pressing member 142 and the movable cam plate 40.

The movable cam-side hollow portion 145b is formed to have expanded hollow portions 171 therein. The expanded hollow portions 171 extend to corresponding turning areas 141a of the cylindrical projecting portion 41 of the movable cam plate 40. Each of the turning areas 141a follows a corresponding turning direction Z of the cylindrical projecting portion 41 of the movable cam plate 40 with the rivet serving as a fulcrum. In the figure, reference numeral 149 denotes a rivet hole.

In the present modified embodiment, the hollow portion 145 of the pressing member 142 pivotally supported by the movable cam plate 40 and the rivet 43 has the expanded hollow portions 171 formed therein, which extend to the corresponding turning areas 141a of the cylindrical projecting portion 41 along the corresponding turning directions of the movable cam plate 40, with the rivet 43 serving as a fulcrum. This enlarges a range where a possible deflection of the pressing due to the misalignment between the pressing member 142 and the movable cam plate 40 defined in position by the cylindrical boss portion 31 of the fixed cam plate 32 is minimized or substantially prevented. Thus, the shift feeling during shifting can be more stable. In addition, the permissible range of acceptable alignment between the fixed cam plate 32 and pressing member 142 is increased by the provision of the expanded hollow portions 171.

The clutch release mechanism according to the embodiment and its modification of the present invention has been described thus far. However, the clutch release mechanism of the invention includes various modes within the scope of the gist of the invention and is not limited to the embodiment and the like as described above.

For example, in the present embodiment, the clutch release mechanism may not require the rivet 43 to function as a positioning member holding the relative alignment position between pressing member 42 and the movable cam plate 40.

During the assembly process, the pressing member 42 is defined in position in the collar member 21 via the release bearing 22 interposed therebetween. The cylindrical projecting portion 41 of the movable cam plate 40 is fitted into the hollow portion 45 of the pressing member 42, so that it does not almost move even without the rivet 43. Since the other end of the movable cam plate 40 is engaged with the clutch arm 61, the position of the movable cam plate 40 is sufficiently determined for starting of the assembly.

Specifically, the axis Y of the cylindrical boss portion 31 of the fixed cam plate 32 may be slightly misaligned with the axis B of the movable cam plate 40. Even in such a case, if the cylindrical boss portion 31 is once started to go into the hollow bore 41b in the cylindrical projecting portion 41 of the movable cam plate 40, the axis B of the movable cam plate 40 is shifted along the axis Y to achieve relative alignment. Thus, accurate assembly is done by the coaxial alignment of the cylindrical boss portion 31 in of the cylindrical projecting portion 41 which, in turn, is coaxially received in the hollow portion 45 of the pressing member 42.

After the insertion of the cylindrical boss portion 31 into the cylindrical projecting portion 41, the movable cam plate 40 is turned in the state where the cylindrical projecting portion 41 is then fitted into the pressing member 42, while pivotally supported on the cylindrical boss portion 31. Therefore, the rivet 43 is unnecessary.

In this way, it is possible to eliminate the rivet 43 serving as the positioning member holding the relative alignment position between the pressing portion 42 and the movable cam plate 40. Thus, the number of component parts can be reduced.

Although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

What is claimed is:

1. A clutch release mechanism comprising:
   a fixed cam plate held by a case member which covers a multiple disk clutch device, the fixed cam plate comprising a cylindrical boss portion disposed adjacent to, and coaxial with a main shaft of a transmission, the cylindrical boss portion rotatably supporting a movable cam plate thereon so as to be turnable coaxially with the main shaft;
   the movable cam plate formed with a cylindrical projecting portion which is rotatably and axially slidably supported relative to the fixed cam plate by inserting the cylindrical boss portion through a hollow bore formed in the cylindrical projecting portion, the movable cam plate capable of being turned through engagement with a clutch arm of the transmission;
   a ball unit housed between the fixed cam plate and the movable cam plate, the ball unit comprising a retainer member supported on the fixed cam plate which retains the ball unit thereon;
   a release member configured and arranged for selective disengagement of the multiple disk clutch device by transmitting, to a pressure-applying plate, a thrust force generated by relative turning of the fixed cam plate and the movable cam plate which hold the ball unit therebetween; and
   a pressing member fitted to the release member via a bearing, and configured to be pressed by the movable cam plate to receive the thrust force and transmit the thrust force to the release member via the bearing;
   wherein the pressing member has a hollow portion formed therethrough and extending in the main shaft direction, wherein the movable cam plate is formed to allow the cylindrical projecting portion thereof to project toward the pressing member,
   and wherein the cylindrical projecting portion of the movable cam plate fits into the hollow portion of the pressing member with a gap defined therebetween, and is operable to press the pressing member so as to be relatively shiftable on a flat surface perpendicular to a pressing direction.

2. The clutch release mechanism according to claim 1, wherein the hollow portion of the pressing member is formed with a step therein, such that an inner diameter on a side of the pressing member adapted to receive the cylindrical projecting portion of the movable cam plate is greater than an inner diameter on a side fitted to the bearing.

3. The clutch release mechanism according to claim 1, wherein the pressing member and the movable cam plate are pivotally supported to be concurrently turnable, with a positioning member holding a relative alignment position serving as a fulcrum,
   and wherein the hollow portion of the pressing member is formed to have an expanded hollow portion extending to a turning area of the cylindrical projecting portion of the movable cam plate with the positioning member serving as a fulcrum.

4. The clutch release mechanism according to claim 3, wherein the positioning member is a rivet.

5. The clutch release mechanism according to claim 3, wherein selected components of the clutch release mechanism are configured to permit a limited range of movement between the pressing member and the movable cam plate, such that the pressing member is pivotally movable about an axis which is substantially perpendicular to a central axis of the positioning member.

6. The clutch release mechanism according to claim 5, wherein the positioning member is a rivet.

7. The clutch release mechanism according to claim 5, further comprising a coil spring surrounding the positioning member in an area thereof extending between the pressing member and the movable cam plate.

8. The clutch release mechanism according to claim 3, further comprising a coil spring surrounding the positioning member in an area thereof extending between the pressing member and the movable cam plate.

9. The clutch release mechanism according to claim 1, wherein a relative alignment between the pressing member and the movable cam plate is achieved by insertion of the cylindrical boss portion of the fixed cam plate into a hollow bore in the cylindrical projecting portion of the movable cam plate, and insertion of the cylindrical projecting portion of the movable cam plate into the hollow portion of the pressing member, without requiring another connection between the pressing member and the movable cam plate.

10. The clutch release mechanism according to claim 9, further comprising a coil spring surrounding the positioning member in an area thereof extending between the pressing member and the movable cam plate.

11. The clutch release mechanism of claim 1, wherein a relative alignment between the pressing member and the movable cam plate is achieved by the insertion of the cylindrical boss portion of the fixed cam plate into a hollow bore in the cylindrical projecting portion of the movable cam plate, and insertion of the cylindrical projecting portion of the movable cam plate into the hollow portion of the pressing member.

12. A clutch release mechanism for selectively releasing engagement of a multiple disk clutch device, comprising:

a connection plate having a hole formed therein;
an annular collar member disposed in the hole of the connection plate and supporting a release bearing therein;
a pressing member having a hollow bore formed therethrough, the pressing member comprising an annular sleeve portion which fits into an inner race of the release bearing;
a movable cam plate comprising a cylindrical projecting portion which fits into the hollow bore of the pressing member with a gap formed therebetween, the cylindrical projecting portion also having a hollow bore formed therethrough;
a fixed cam plate comprising a plate portion having a hole formed therein, and a cylindrical boss portion journaled through the hole of the fixed cam plate, part of the cylindrical boss portion extending outwardly away from the plate portion and into the hollow bore of the cylindrical projecting portion of the movable cam plate;
and a ball unit disposed between the between the plate portion of the fixed cam plate and the movable cam plate, the ball unit comprising a retainer member supported on the cylindrical boss portion of the fixed cam plate, and a plurality of balls rotatably supported by the retainer member.

13. The clutch release mechanism according to claim 12, wherein the hollow portion of the pressing member is formed with a step therein, such that an inner diameter on a side of the pressing member adapted to receive the cylindrical projecting portion of the movable cam plate is greater than an inner diameter on a side fitted to the bearing.

14. The clutch release mechanism according to claim 12, wherein the pressing member and the movable cam plate are pivotally supported to be concurrently turnable, with a positioning member holding a relative alignment position serving as a fulcrum,
and wherein the hollow portion of the pressing member is formed to have an expanded hollow portion extending to a turning area of the cylindrical projecting portion of the movable cam plate with the positioning member serving as a fulcrum.

15. The clutch release mechanism according to claim 12, wherein a relative alignment between the pressing member and the movable cam plate is achieved by insertion of the cylindrical boss portion of the fixed cam plate into the hollow bore in the cylindrical projecting portion of the movable cam plate, and insertion of the cylindrical projecting portion of the movable cam plate into the hollow portion of the pressing member, without requiring another connection between the pressing member and the movable cam plate.

16. A clutch assembly comprising:
a case member;
a multiple disk clutch device comprising;
　a clutch outer cover having an open end and a closed end;
　a pressure-applying plate disposed inside of the clutch outer cover adjacent the closed end thereof;
　a connection plate affixed to the pressure-applying plate and having a hole formed therein;
　an annular collar member disposed in the hole of the connection plate and supporting a release bearing therein;
　a plurality of spaced-apart drive plates operatively attached to the clutch outer cover for concurrent rotation therewith;
　a clutch inner member which is disposed inside the clutch outer cover and which has a plurality of driven plates operatively attached thereto for concurrent rotation therewith; and
　a pressure-receiving plate formed integrally with the clutch inner member;
a fixed cam plate operatively attached to the case member, the fixed cam plate comprising a plate portion and a cylindrical boss portion disposed adjacent to, and coaxial with a main shaft of a transmission, the cylindrical boss portion rotatably supporting a movable cam plate thereon so as to be turnable coaxially with the main shaft;
the movable cam plate formed with a cylindrical projecting portion which is rotatably and axially slidably supported relative to the fixed cam plate by inserting the cylindrical boss portion of the fixed cam plate through a hollow bore formed in the cylindrical projecting portion, the movable cam plate capable of being turned through engagement with a clutch arm of the transmission;
a ball unit housed between the plate portion of the fixed cam plate and the movable cam plate, the ball unit comprising a retainer member supported on the fixed cam plate which retains the ball unit thereon;
a release member configured and arranged for selective disengagement of the multiple disk clutch device by transmitting, to the pressure-applying plate, a thrust force generated by relative turning of the fixed cam plate and the movable cam plate which hold the ball unit therebetween; and
a pressing member fitted to the release member via a bearing, and pressed by the movable cam plate to receive the thrust force and transmit the thrust force to the release member via the bearing;
wherein the pressing member has a hollow portion formed therethrough and extending in the main shaft direction,
wherein the movable cam plate is formed to allow the cylindrical projecting portion thereof to project toward the pressing member,
and wherein the cylindrical projecting portion of the movable cam plate fits into the hollow portion of the pressing member with a gap defined therebetween, and the movable cam plate is operable to press the pressing member so as to be relatively shiftable on a flat surface perpendicular to a pressing direction.

17. The clutch assembly according to claim 16, wherein the hollow portion of the pressing member is formed with a step therein, such that an inner diameter on a side of the pressing member adapted to receive the cylindrical projecting portion of the movable cam plate is greater than an inner diameter on a side fitted to the bearing.

18. The clutch assembly according to claim 16, wherein the pressing member and the movable cam plate are pivotally supported to be concurrently turnable, with a positioning member holding a relative alignment position serving as a fulcrum,
and wherein the hollow portion of the pressing member is formed to have an expanded hollow portion extending to a turning area of the cylindrical projecting portion of the movable cam plate with the positioning member serving as a fulcrum.

19. The clutch assembly according to claim 16, wherein a relative alignment between the pressing member and the movable cam plate is achieved by insertion of the cylindrical boss portion of the fixed cam plate into a hollow bore in the cylindrical projecting portion of the movable cam plate, and the subsequent insertion of the cylindrical projecting portion of the movable cam plate into the hollow portion of the pressing member, without requiring another connection between the pressing member and the movable cam plate.

20. The clutch assembly according to claim 16, wherein selected components of the clutch release mechanism are configured to permit a limited range of movement between the pressing member and the movable cam plate, such that the pressing member is pivotally movable about an axis which is substantially perpendicular to a central axis of the positioning member.

* * * * *